May 15, 1951 C. FRAUEN 2,553,448
FOOT BRAKE PEDAL HOLDER
Filed Dec. 2, 1949
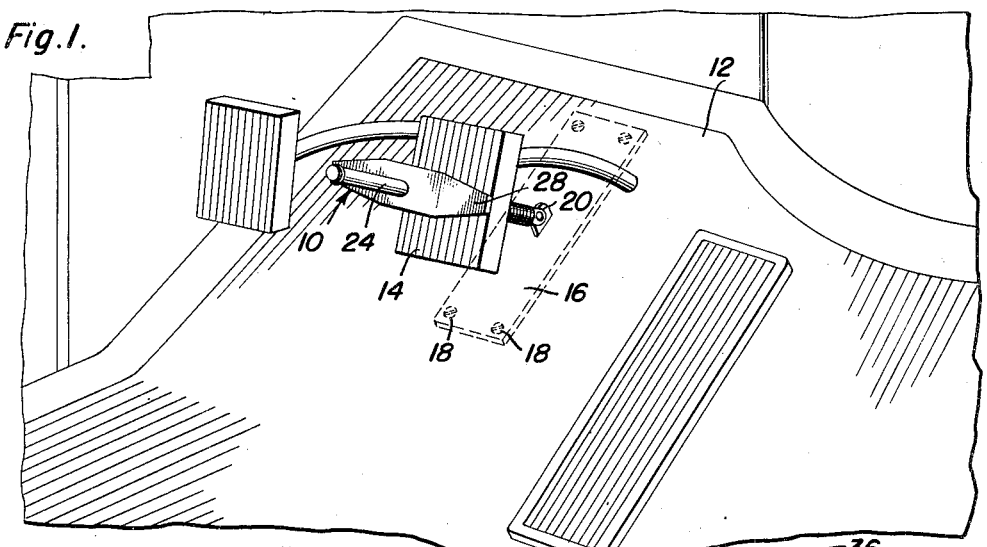
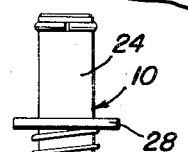
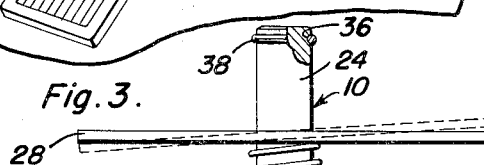
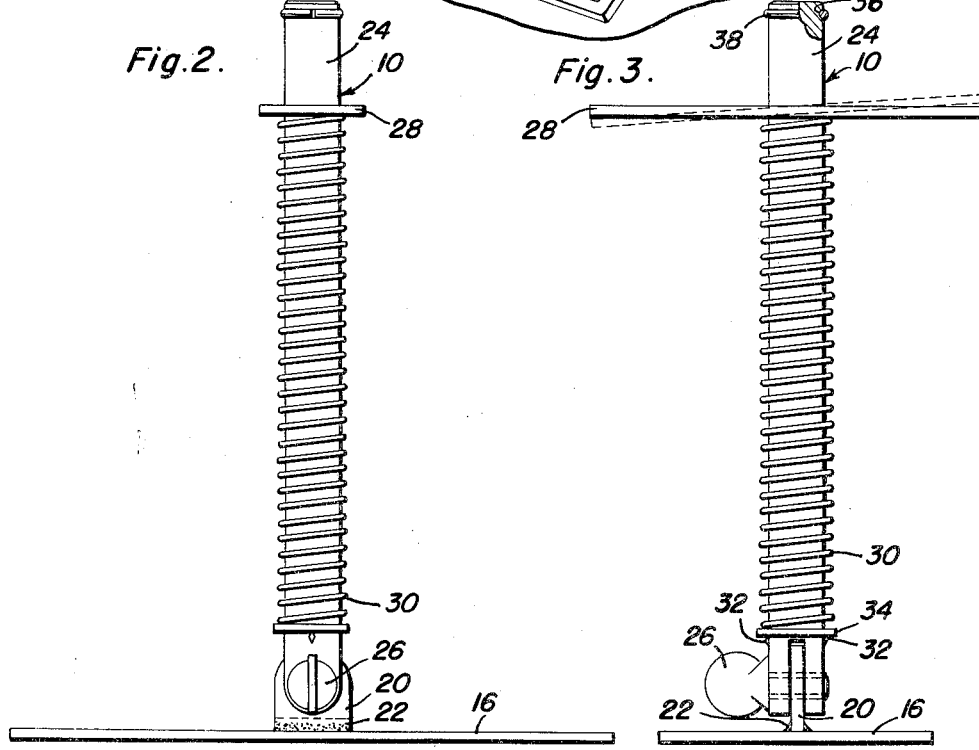
Clause Frauen
INVENTOR.

Patented May 15, 1951

2,553,448

UNITED STATES PATENT OFFICE 2,553,448

FOOT BRAKE PEDAL HOLDER

Clause Frauen, Ainsworth, Nebr.

Application December 2, 1949, Serial No. 130,797

4 Claims. (Cl. 74—531)

This invention comprises novel and useful improvements in foot brake holding means, and more specifically pertains to an improved device for retaining a foot brake in its depressed brake holding position.

Various objects of this invention are to provide a device for holding a foot brake in its depressed brake holding position, which means may be adapted to existing vehicles having foot brakes, with the necessity of but minor alterations, and which device is of simple and inexpensive yet sturdy construction, and which is highly adaptable for the purposes intended.

An important feature of this invention resides in the provision for a brake holding device having a brake pedal engaging member which is actuated into its locking position by the upwardly biased brake pedal.

Another feature of this invention resides in the provision or means for adjustably positioning the brake pedal holding device into or out of its pedal engaging position, permitting unobstructed use of the brake pedal, when the brake pedal holding device is not being utilized.

Yet another feature of this invention, resides in the provision or means for returning the pedal engaging member into a position so as to always be in readiness for use.

These, together with various ancillary objects and features of the invention which will later become apparent as the description proceeds, are attained by this device, a preferred embodiment of which has been illustrated by way of example only in the accompanying drawings wherein:

Figure 1 is a perspective view of the device shown attached to a car, the device being in its pedal depressing brake holding position.

Figure 2 is a side elevational view of the device.

Figure 3 is a front elevational view of the device.

Referring now to the accompanying drawings wherein like numerals designate similar parts throughout the various views, it can be seen from a consideration of Figure 1, that the brake holding device indicated generally by the numeral 10 may be readily attached to the floorboard of a car indicated generally by the numeral 12, so as to permit positioning of the brake holding device 10 into engagement with a brake pedal, indicated by the numeral 14.

The brake holding device 10 may be attached to the floorboards 12 in any desired manner, but preferably there is provided a floor plate 16 which is secured to the floorboard 12 by screws 18 or the like. Mounted upon the face of the floor plate 16 is a key 20 which is secured to the floor plate 16 in any desired manner such as by welding 22. Pivotally mounted upon the key is a standard 24, the pivotal movement of the standard 24 being adjustable as by the thumb screw 26.

Slidably and tiltably mounted intermediate the ends of the standard 24 is a transverse member 28, the plate 28 being yieldingly biased upwardly relative to the standard 24, by means of a spring 30. Preferably at the lower end of the standard 24 are projections 32 which provide means for supporting the spring retaining washer 34, which washer supports the spring 30 thereabove.

Means may also be provided for restraining the upward travel of the transverse member 28 relative to the standard 24, these means may consist of an annular groove 36 in the upper portion of the standard 24, in which an annular spring coil 38 is secured.

In operation, the brake pedal locking device 10 is pivoted about the key 20, the transverse member 28 being positioned so as to engage the top of the brake pedal 14. When it is desired to lock the brake pedal 14 into its downwardly brake engaging position, pressure is applied to both ends of the transverse member 28, thereby depressing the brake pedal 14, and applying the brake. When it is desired to lock the brake holding device in its lowered position, pressure is removed from that side of the transverse member 28 which is in engagement with the top of the brake pedal 14, the upwardly biased brake pedal 14 causing the transverse member 28 to tilt relative to the standard 24, thereby locking the transverse member 28 relative to the standard. Further pivotal movement of the standard 24 relative to the plate 16 may then be restrained by means of the thumb screw 26, thereby preventing the accidental movement of the brake pedal holding device 10 out of its pedal engaging position, in the event the brake holding device or the motor vehicle itself is suddenly jarred.

Disengagement of the brake holding device 10 from the brake pedal 14, is accomplished by placing pressure on both ends of the transverse member 28, and permitting the spring 30 to bias the transverse member 28 to its upward brake disengaging position.

Storage of the brake holding device 10, is accomplished by loosening the thumb screw 26, and pivoting the standard 24 either forwardly or rearwardly so that the brake holding device 10, in its inoperative position, will rest upon the floorboard 12 of the vehicle.

From the foregoing, the construction and operation of the device together with the advantages of the same will be readily understood and accordingly, further explanation is believed to be unnecessary. However since numerous modifications and changes will readily occur to those skilled in the art, after a consideration of the foregoing specification and accompanying drawings, it is not desired to limit the invention to the exact construction which has been shown and described, and accordingly the principles of the invention are to be regarded as limited only by the scope of the appended claims.

Having described my invention, what I claim as new is:

1. In a motor vehicle having a foot brake pedal arm, said pedal arm being yieldingly biased away from its lower braking position, and a pedal pad attached to said arm for movement therewith; foot brake holding means comprising a standard mounted adjacent said pedal arm, a transverse plate member mounted on said standard for sliding and rocking movement relative thereto and having a portion thereof overlying the upper surface of said pedal pad, said member being slidable on said standard when disposed parallel to the upper surface of said pedal pad, said member being tiltable into locking position on said standard by the upwardly biased brake pedal pad.

2. In combination with a foot brake pedal arm having a pedal pad attached thereto for movement therewith through an arcuate path into and out of braking position, a standard pivotally mounted adjacent said pedal arm for movement in a plane parallel to the arcuate path of movement of said pedal pad, a transverse plate member mounted no said standard for sliding and rocking movement relative thereto and having a portion thereof overlying the upper surface of said pedal pad, said member being slidable on said standard when disposed parallel to the upper surface of said pedal pad, said member being tiltable into locking position by said upwardly biased pedal pad.

3. The combination of claim 2 wherein said transverse member overlies said pedal pad when said member is disposed perpendicular to the plane of pivotal movement of said standard.

4. The combination of claim 3 including means disposed about said standard yieldingly biasing said member towards the free end of said standard.

CLAUSE FRAUEN.

REFERENCES CITED

The following references are of record in the file of this patent:

UNITED STATES PATENTS

| Number | Name | Date |
|---|---|---|
| 1,154,012 | Harden | Sept. 21, 1915 |
| 1,461,771 | Engle | July 17, 1923 |
| 1,463,676 | Custer | July 31, 1923 |
| 1,545,531 | Strand | July 14, 1925 |
| 1,593,489 | Faiman | July 20, 1926 |
| 2,389,199 | Laird | Nov. 20, 1945 |